UNITED STATES PATENT OFFICE.

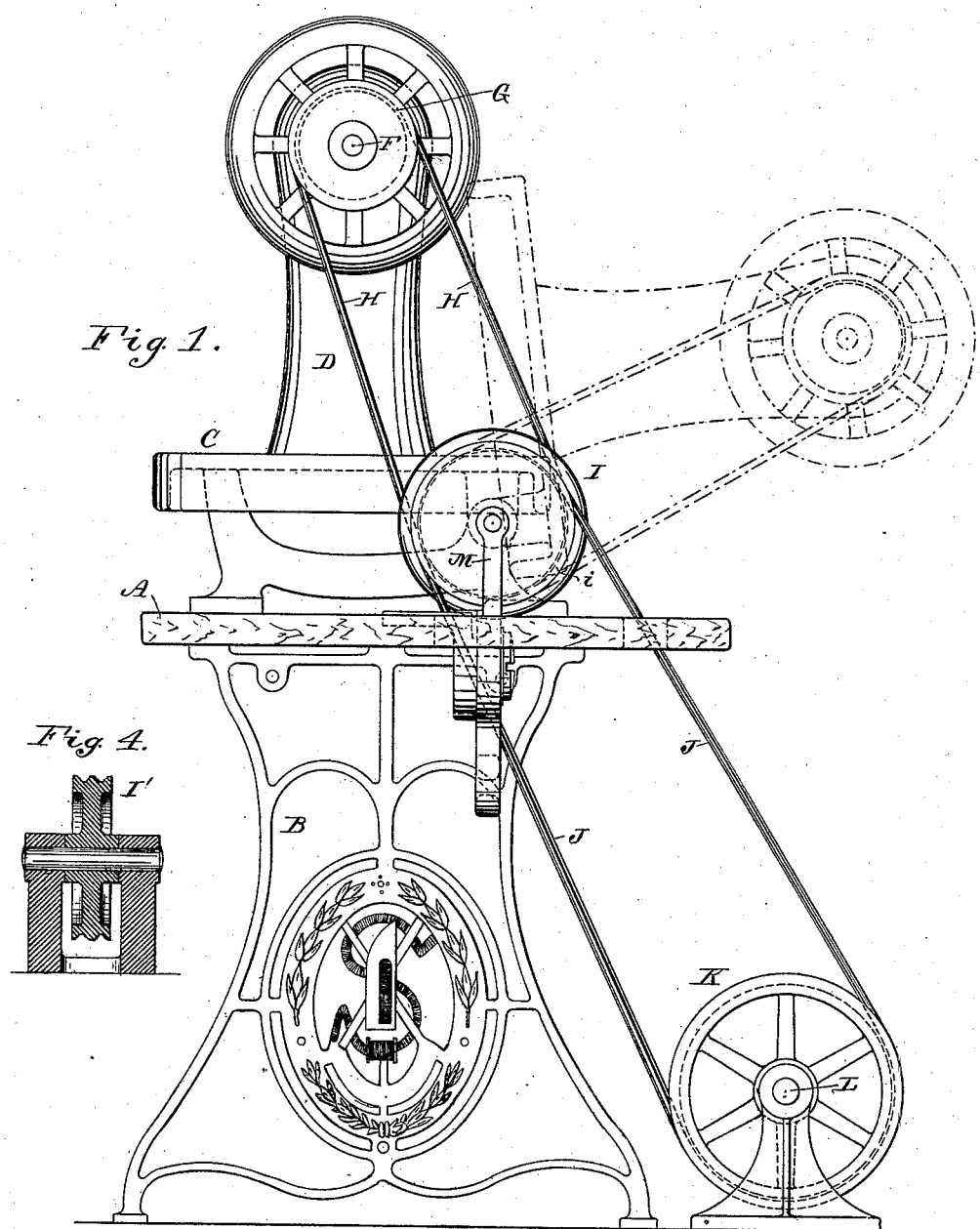

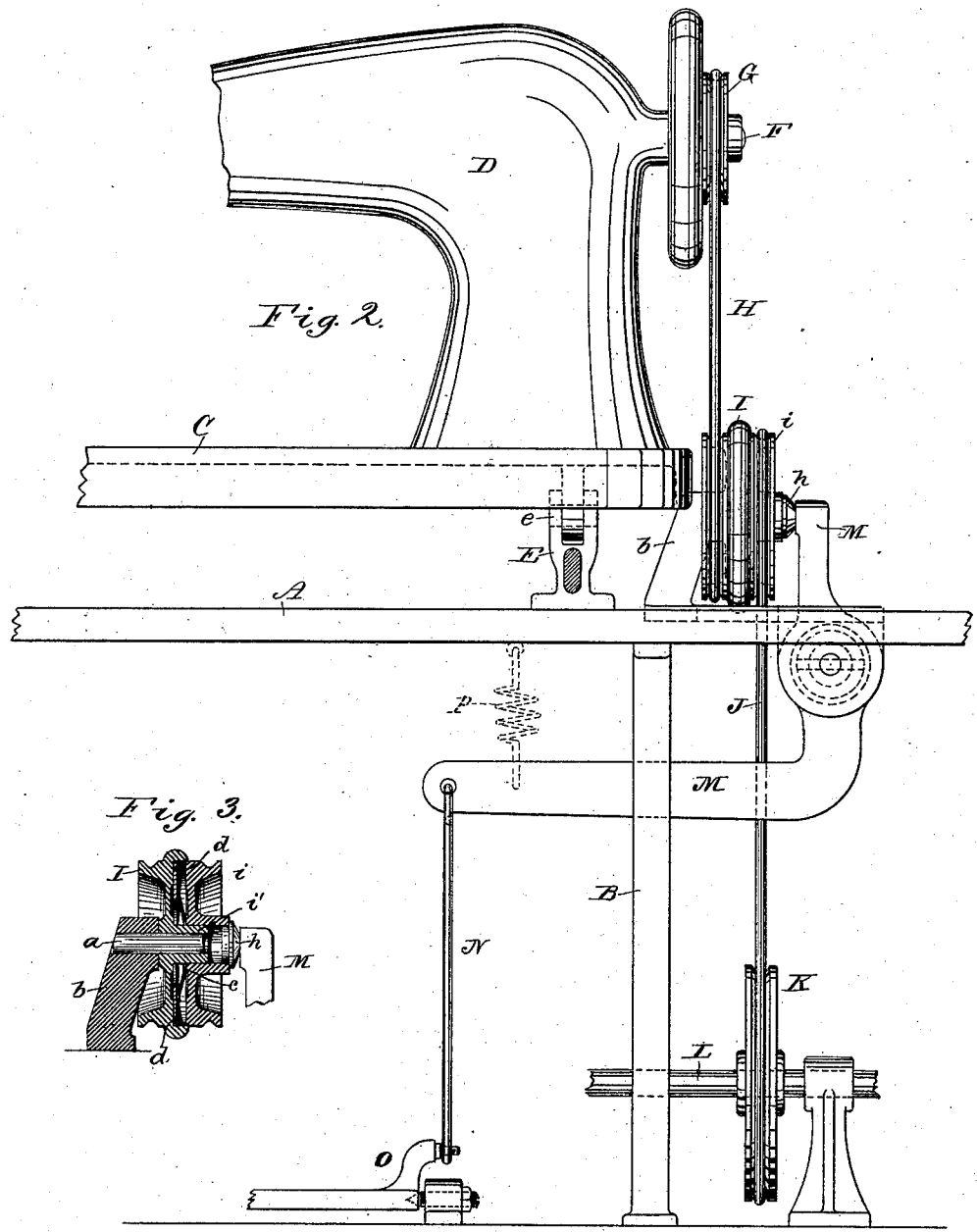

JAMES G. GREENE, OF ELIZABETH, NEW JERSEY, ASSIGNOR TO THE SINGER MANUFACTURING COMPANY OF NEW JERSEY.

DRIVING MECHANISM FOR SEWING-MACHINES.

SPECIFICATION forming part of Letters Patent No. 365,918, dated July 5, 1887.

Application filed June 12, 1886. Serial No. 205,935. (No model.)

*To all whom it may concern:*

Be it known that I, JAMES G. GREENE, a citizen of the United States, residing at Elizabeth, in the county of Union and State of New Jersey, have invented certain new and useful Improvements in Driving Mechanisms for Sewing-Machines, of which the following is a specification, reference being had therein to the accompanying drawings.

My invention relates to a driving mechanism for sewing-machines of such construction that the inconvenience incidental to removing the belt from the driving-pulley when the machine is turned up on its hinges to give access to the mechanism beneath the bed-plate may be avoided.

In carrying my invention into effect I provide a compound driving-pulley, the axis of which is in line, or nearly so, with the pivots or hinges by which the machine is secured to its table, or to brackets supported thereby, and on which said machine swings when it is turned up or down. This compound pulley has two grooves for the reception of two endless belts, one of which runs from a pulley on the driving or power shaft beneath the table to the said compound pulley, and the other from the latter to the pulley on the driving or main shaft of the sewing-machine.

I prefer to construct my compound pulley in the form of a clutch, one portion of which may run loose from the other at times, the two parts of the pulley being adapted to be coupled and run together, when desired. The clutch is operated to apply or disconnect the power by a clutch-lever connected with a treadle controlled by the operator.

In the drawings, Figure 1 is an end view of a "Singer" button-hole sewing-machine with my invention applied thereto. Fig. 2 is a partial elevation of the same, and Figs. 3 and 4 are sections of compound driving-pulleys.

A denotes the table of the machine, and B one of the side frames of the stand by which the table is supported.

C is the bed-plate of the machine, and D the arm.

With ordinary family machines the bed-plates thereof are usually hinged directly to the tables; but with button-hole sewing-machines it is found most convenient to hinge the bed-plates to brackets, as E, attached to the table.

On the driving shaft F of the machine is an ordinary pulley, G, connected by an endless belt, H, with a compound pulley, I i, the axis of which is in line, or nearly so, with the hinges or pivots at e, on which the machine turns when swung backward to the position indicated by dotted lines in Fig. 1.

J is a second endless belt connecting the compound pulley with a pulley, K, on a power or driving shaft, as L, beneath the table.

I prefer to construct my compound pulley in the form of a friction-clutch, as more clearly shown by Fig. 3, the part i, on which the belt J runs, being adapted to be pressed toward the part I by the clutch-lever M, connected by a rod, N, with the treadle O. The part I of the clutch or compound pulley runs loose on a stud or pin, a, sustained by a standard, b, on the table A, and the part i runs loose on the hub i' of the part I. Between the said parts I prefer to employ a spring, c, made in the form of a washer or a spider-spring, and a washer, d, against which the said spring c bears, these devices forming the frictional connections between the parts of the clutch. The clutch-lever O presses against a center plug or button, h. If desired, a tracting-spring, as P, (indicated by dotted lines in Fig. 2,) may be employed to disconnect the parts of the clutch.

The compound pulley may be of any suitable size to impart the requisite speed to the driving-shaft of the machine from the power-shaft, and may consist of a friction-clutch, as shown in Fig. 3, or of a single solid pulley, I', with two belt-grooves, (see Fig. 4,) or of two separate grooved pulleys mounted on the same shaft.

From the foregoing it will be apparent that as the axis of the compound pulley is in line with the hinges of the machine the latter may be turned over to the position indicated by dotted lines in Fig. 1 without disturbing the driving-belts, and that the power may be conveniently applied to the machine by the treadle-operated clutch mechanism above described.

Having thus described my invention, I claim and desire to secure by Letters Patent—

1. The combination, with a sewing-machine bed-plate, a table, and pivots or hinges for enabling the former to be turned upon the latter, of a compound pulley constructed to form a friction clutch, and having its axis in line with the hinge-pivots, the driving-pulley, the power-pulley, and the two endless belts, substantially as set forth.

2. The combination, with the table, the sewing-machine bed-plate, and the brackets to which the latter is hinged or pivoted, of a compound pulley having its axis in line with the hinge-pivots, the driving-pulley, the power-pulley, the endless belts, the clutch-lever, the connecting-rod, and the treadle, substantially as set forth.

In testimony whereof I affix my signature in presence of two witnesses.

JAMES G. GREENE.

Witnesses:
PHILIP DIEHL,
ALBERT D. VENTZ.